United States Patent Office 2,801,183
Patented July 30, 1957

2,801,183
REFRACTORIES AND METHODS OF MAKING THEM

Michel Kantzer, Paris, France, assignor to Societe Anonyme des Manufactures des Glaces et Produits Chimiques de Saint-Gobain, Chauny & Cirey, Paris, France No Drawing. Application April 24, 1951,
Serial No. 222,739

Claims priority, application France April 25, 1950

13 Claims. (Cl. 106—67)

This invention relates to a novel process for the production of novel refractories. The invention also relates to materials for the construction of glass furnaces and methods of making them. The invention will be described in its relation to the glass industry, but this particular description is chosen because the refractories are of particular value in that industry and is not to be construed as a limitation on the scope of the invention as the applicant is entitled to protection on every use to which the new refractories may be put.

Sillimanite is a silicate of aluminum, $Al_2SiO_5$. It is rare and costly, and it is difficult to procure, but when fired at about 1500° C. it is marked by exceptional resistance to fire and to the corrosive action of the molten glass in industrial glass making furnaces. It is, consequently, desirable as a refractory for furnace construction but its cost and rarity limit its use.

It is an object of the invention to make silico-aluminous refractories of high quality, equivalent in effect to fired sillimanite, particularly for use in the building of glass furnaces, and to make them by novel processes rapid in output and avoiding the use of rare ingredients. Other objects will be apparent as the description proceeds.

The objects of the invention are accomplished, generally speaking, by acting upon kaolinaceous clay by the novel process described hereinafter.

The raw material employed in the process is kaolinaceous clay, which may or may not contain free silica, both types being useful. Kaolinaceous clays are hydrated aluminum silicates in which $Fe_2O_3$, $TiO_2$, alkaline and alkaline earth oxides are present only in small proportions. They are found abundantly in various parts of the world.

In the first step of the process the kaolinaceous clay is subjected to a temperature of 600–750° C. It is known that if a kaolinaceous clay is heated to a temperature between 600 and 750° C. a conversion occurs which is sometimes termed a conversion into metakaolin (B. Long "Proprietes Physiques et Fusion du Verre," Dunod Editor, 1933, page 429).

The applicant has established that, during this conversion, all crystalline structure disappears at the end of an adequate period of time and the alumina and the silica, which are in the amorphous state at this temperature, will be able to recrystallise by a further treatment under requisite conditions. The time required varies with the content of free silica, the granularity of the clay, and the quantity of impurities contained in the clay. The length of time required to attain crystal-free structure varies with the clays from different sources, but the time may be determined for a particular clay by taking samples.

This time is determined for a particular clay by making examinations with X-rays (method of Debye-Scherrer) on samples having been submitted to different durations of the heating treatment.

When the crystalline structure has disappeared the mass is cooled and granulated by any satisfactory method. The granules are then put in a mold and are subjected to pressure in the cold sufficient to form a self-sustaining structure which is removed from the mold and further treated. The molding pressure can be used to produce a difference in the internal structure of the final product, as higher molding pressure produces a higher degree of internal compactness in the product. Satisfactory results have been obtained with pressures on the order of 200 to 600 kg. per square centimeter, but it must be understood that lower or higher pressures which are commonly used in the refractory industry, may be utilized.

The further treatment involves the firing of the molded piece at a temperature circa 1500° C., at which temperature it re-crystallizes in the state of mullite, with a highly compact crystalline structure, and the qualities of natural sillimanite which has been fired at 1500° C.

It is advantageous to add to the process a step conceived to facilitate the recrystallization. After the heating at 600–750° C., cooling and granulating of the amorphous product, some unfired sillimanite in a finely divided state may be intimately mixed with the mass before firing. The quantity required for material improvement is quite small, it being unnecessary to exceed 5% by weight of the amorphous product.

The following example is for purposes of illustration only, and does not constitute a restriction on the generality of what is elsewhere herein stated or claimed.

Example

A kaolin clay, containing 5% of free silica, has been heated to 600° C. and maintained at this temperature during five hours, and afterwards cooled without special precautions. The resulting product, examined by X-rays has proved to be in an amorphous state. This product was then ground and passed through a seive having 200 mesh per linear inch, mixed with five percent of sillimanite in the same state of fineness, molded under a pressure of 500 kg. per square centimeter, in small bricks. These bricks were fired at 1500° C., during about 10 hours. These bricks were used together with natural sillimanite bricks of the same dimensions in a glass-furnace and have been found to be at least equivalent to the sillimanite bricks as to their behavior in contact with glass.

The invention contemplates a process for obtaining refractory pieces of silico-aluminous composition of high quality from kaolinaceous clays, which comprises raising the clay to a temperature between 600° and 750° C. long enough to destroy all crystalline structure, cooling the product, finely dividing it, molding it under pressure in the cold, and firing it at circa 1500° C. until the transformation into mullite is completed. It contemplates the eventual addition of silimanite, after the initial destruction of the crystalline structure and before firing, in order to promote recrystallization.

As many apparently widely different embodiments of the present invention may be made without departing from the spirit and scope thereof, it is to be understood that the invention is not limited thereto.

What is claimed is:

1. The method of preparing a refractory that comprises heating a kaolinaceous clay to a temperature in the range 600–750° C. until all crystalline structure has disappeared, cooling the mass, finely dividing it, mixing therewith unfired, finely divided natural sillimanite in an amount circa 5% by weight, molding the mixture under pressure and firing the molded piece at a temperature circa 1500° C. until the crystallization of mullite is substantially completed, 2. The method of preparing a refractory that comprises reducing the crystalline structure of kaolinaceous clay to amorphous at a temperature circa 600–750° C., cooling and dividing the mass, mixing therewith a small amount of finely divided unfired sillimanite adequate for seeding, molding the mass under pressure and firing the molded shape at a temperature circa 1500° C. until crystals are formed.

3. The method of preparing a refractory that comprises reducing the whole crystalline structure of kaolinaceous clay to amorphous by heating it at about 600–750° C., cooling the mass, finely dividing it, molding it under pressure and firing the molded piece at about 1500° C.

4. The method of preparing a refractory that comprises substantially wholly reducing the crystalline structure of kaolinaceous clay to amorphous by heating it at about 600–750° C., cooling and molding the mass, and firing the mass at about 1500° C.

5. A method for the production of high quality silico-aluminous refractory articles which comprises bringing kaolinaceous clay to a temperature between 600 and 750° C. for a time sufficient to substantially destroy the entire crystalline structure, cooling the material thus treated, suitably comminuting it, moulding it, and firing the moulded article at a temperature of about 1500° C.

6. A method according to claim 5 in which unfired sillimanite, in a small proportion adequate for seeding, is intimately mixed with the clay after the heat treatment of the latter at between 600 and 750° C., and the cooling thereof.

7. The method of preparing a refractory that comprises heating kaolinaceous clay to a temperature and for a time adequate to substantially destroy the crystalline structure of the aluminum hydrosilicates of said clay, terminating the heating and cooling the product without producing recrystallization, and thereby producing a substantially amorphous mass, finely dividing it, molding it under pressure and firing the molded piece at a temperature and during a time sufficient to substantially complete the formation of crystals of mullite, said molded piece submitted to firing being substantially free of crystals of aluminum hydrosilicates of crude clay.

8. The method of preparing a refractory that comprises substantially destroying the crystalline structure of aluminum hydrosilicates of kaolinaceous clay by heating at about 600–750° C., cooling the product in order to obtain a substantially amorphous mass, finely dividing it, molding it under pressure and firing the molded piece at a temperature and during a time sufficient to substantially complete the formation of crystals of mullite, said molded piece submitted to firing being substantially free of crystals of aluminum hydrosilicates of crude clay.

9. The method of preparing a refractory that comprises heating kaolinaceous clay to a temperature and for a time adequate to substantially destroy the crystalline structure of aluminum hydrosilicates of said clay, terminating the heating and cooling the product without producing recrystallization, and thereby producing a substantially amorphous mass, finely dividing it, mixing it with a small, seeding amount of finely divided sillimanite, molding it under pressure and firing the molded piece at a temperature and during a time sufficient to substantially complete the formation of crystals of mullite.

10. The method of preparing a refractory that comprises substantially destroying the crystalline structure of aluminum hydrosilicates of kaolinaceous clay by heating, cooling the product in order to obtain a substantially amorphous mass, finely dividing it, mixing it with up to about 5% by weight unfired, finely divided sillimanite, molding it under pressure and firing the molded piece at a temperature and during a time sufficient to substantially complete the formation of crystals of mullite.

11. The method of making a refractory that comprises molding a composition consisting essentially of the substantially amorphous product resulting from the destruction, by the action of temperature about 600–750° C., of the crystalline structure of kaolinaceous clay, and firing the shape at a temperature about 1500° C.

12. The method of claim 11 in which the said amorphous product is mixed with a small seeding amount of a seeding agent constituted by finely divided, unfired sillimanite before the said molding and firing.

13. The method of preparing a refractory that comprises firing at about 1500° C. a piece obtained by molding a finely divided powdered material containing substantially non-crystalline product made by heating kaolinaceous clay at about 600–750° C., and a seeding agent constituted by finely divided unfired sillimanite, said seeding agent amounting to about 0–5% by weight of the powdered material.

References Cited in the file of this patent

UNITED STATES PATENTS

| | | |
|---|---|---|
| 1,647,063 | Tillberg | Oct. 25, 1927 |
| 1,712,005 | Lambie et al. | May 7, 1929 |
| 1,716,395 | Trostel | June 11, 1929 |
| 1,745,102 | Lambie et al. | Jan. 28, 1930 |
| 1,786,482 | Curtis | Dec. 30, 1930 |
| 1,973,408 | Curtis | Sept. 11, 1934 |
| 2,425,152 | Greger et al. | Aug. 5, 1947 |
| 2,467,889 | Harter et al. | Apr. 19, 1949 |
| 2,499,229 | Rankine | Feb. 28, 1950 |

OTHER REFERENCES

Searle: Refractory Materials, Their Manufacture and Uses. 1950.